United States Patent
Applewhite et al.

(10) Patent No.: US 8,684,653 B2
(45) Date of Patent: Apr. 1, 2014

(54) SWING-AWAY REFUSE RECEPTACLE LIFT

(75) Inventors: Blake F. Applewhite, Belton, SC (US); Bryan D. Anderson, Tampa, FL (US)

(73) Assignee: The Heil Co., Chattanooga, TN (US)

( * ) Notice: Subject to any disclaimer, the term of this patent is extended or adjusted under 35 U.S.C. 154(b) by 283 days.

(21) Appl. No.: 13/046,878

(22) Filed: Mar. 14, 2011

(65) Prior Publication Data

US 2011/0229292 A1 Sep. 22, 2011

Related U.S. Application Data

(60) Provisional application No. 61/314,346, filed on Mar. 16, 2010.

(51) Int. Cl.
*B65G 65/38* (2006.01)
*B65G 65/34* (2006.01)
*B65G 65/36* (2006.01)
*B65G 65/23* (2006.01)

(52) U.S. Cl.
CPC ............... *B65G 65/34* (2013.01); *B65G 65/38* (2013.01); *B65G 65/36* (2013.01); *B65G 65/23* (2013.01)
USPC .......................................... 414/404; 414/408

(58) Field of Classification Search
CPC ........... B65B 69/00; B65F 1/12; B65F 1/122; B65F 1/141; B65F 1/1426; B65F 1/1452; B65F 3/02; B65F 3/04; B65G 65/34; B65G 65/36; B65G 65/38; B65G 65/23
USPC ...................... 37/468; 403/321, 322.1, 322.3; 414/404, 408, 409, 414, 419, 421, 723, 414/724
See application file for complete search history.

(56) References Cited

U.S. PATENT DOCUMENTS

| | | | |
|---|---|---|---|
| 3,285,505 A | * | 11/1966 | Katz ............................ 232/43.3 |
| 3,738,516 A | | 6/1973 | Wells |
| 3,804,277 A | | 4/1974 | Brown et al. |
| 3,894,642 A | | 7/1975 | Shive |
| 3,931,901 A | | 1/1976 | Jones |
| 4,365,922 A | | 12/1982 | Borders |
| 4,422,814 A | | 12/1983 | Borders |
| 4,479,751 A | | 10/1984 | Wyman et al. |
| 4,613,271 A | | 9/1986 | Naab |
| 4,773,812 A | | 9/1988 | Bayne et al. |
| 5,018,929 A | * | 5/1991 | Carson ......................... 414/408 |
| 5,148,975 A | * | 9/1992 | Dickerson et al. ............. 232/44 |
| 5,333,984 A | | 8/1994 | Bayne et al. |
| 6,357,988 B1 | | 3/2002 | Bayne |
| 6,644,906 B2 | | 11/2003 | Bayne |

* cited by examiner

*Primary Examiner* — Saul Rodriguez
*Assistant Examiner* — Brendan Tighe
(74) *Attorney, Agent, or Firm* — Dority & Manning, P.A.

(57) ABSTRACT

A swing-away lift is provided. The swing-away lift may allow for mechanized dumping of the contents of a refuse receptacle into a refuse container. Further, the swing-away lift may allow unobstructed access to the refuse container for a refuse-gathering vehicle. The swing-away lift may include a pivot leg, a swing arm, and a lift unit, and may be utilized in conjunction with a refuse container and a refuse receptacle. The swing arm may be pivotably connected to the pivot leg, and may pivot between a first closed position and a second open position. The lift unit may provide mechanized lifting and dumping of a refuse receptacle into a refuse container.

17 Claims, 5 Drawing Sheets

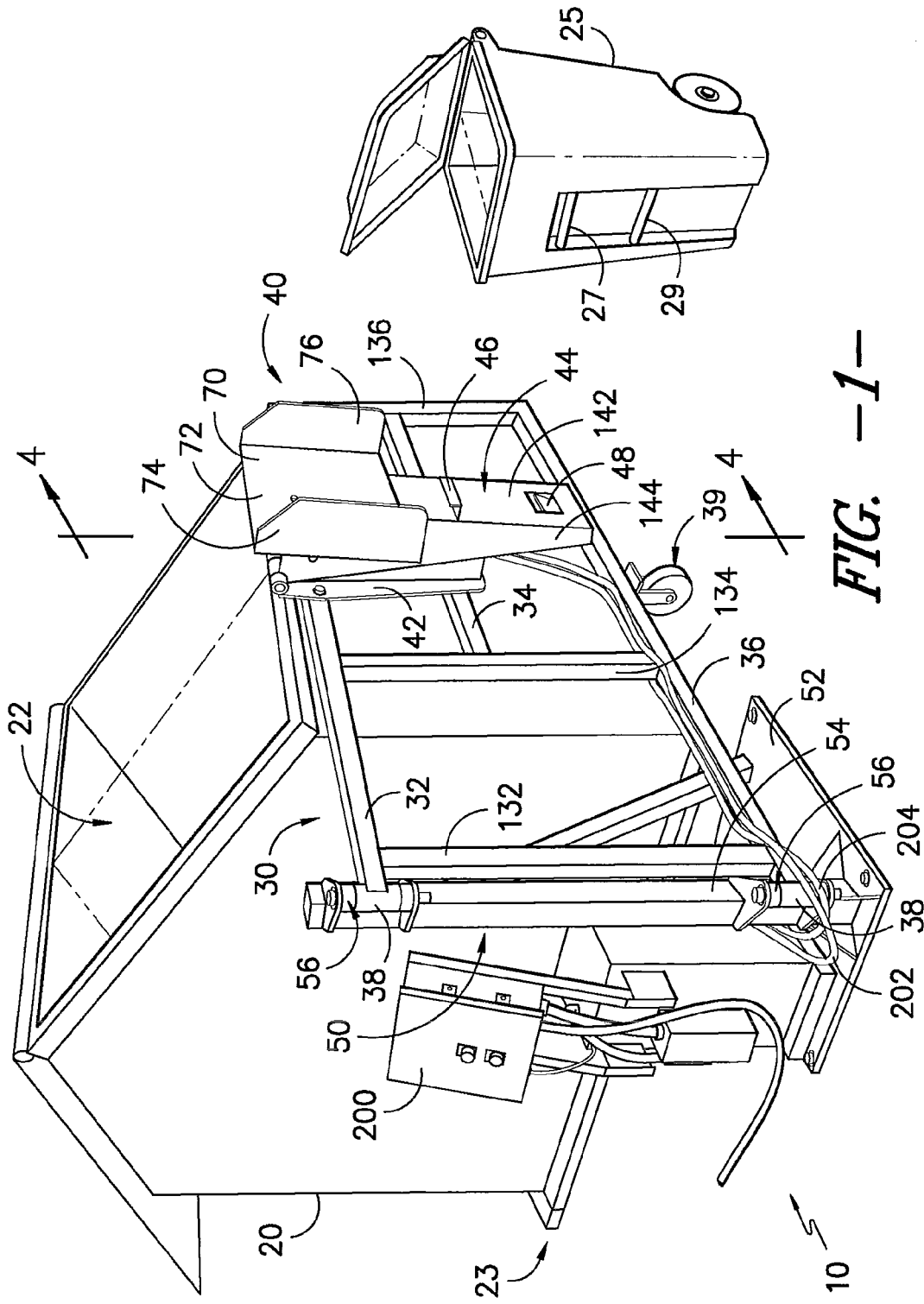
FIG. -1-

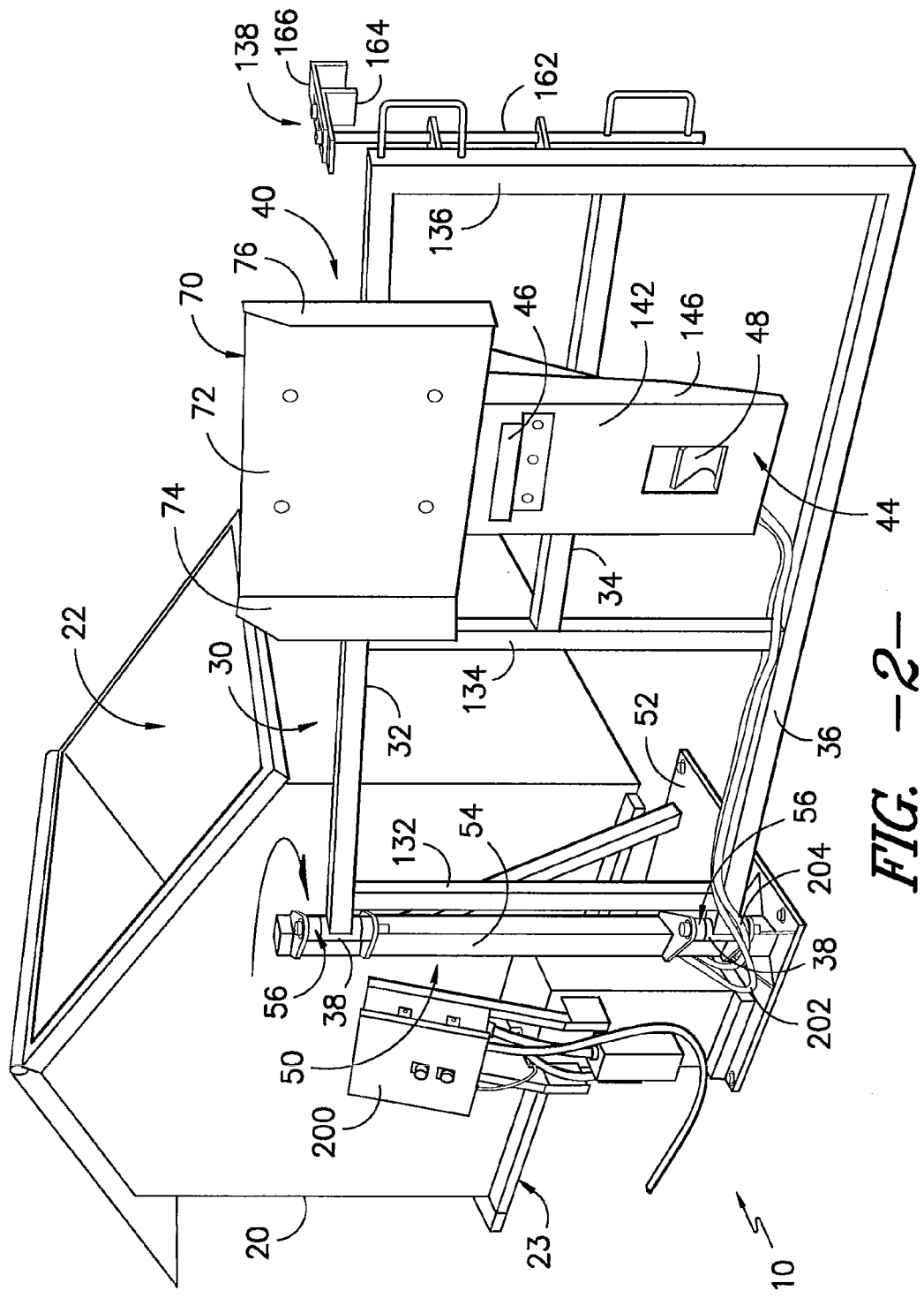
FIG. -2-

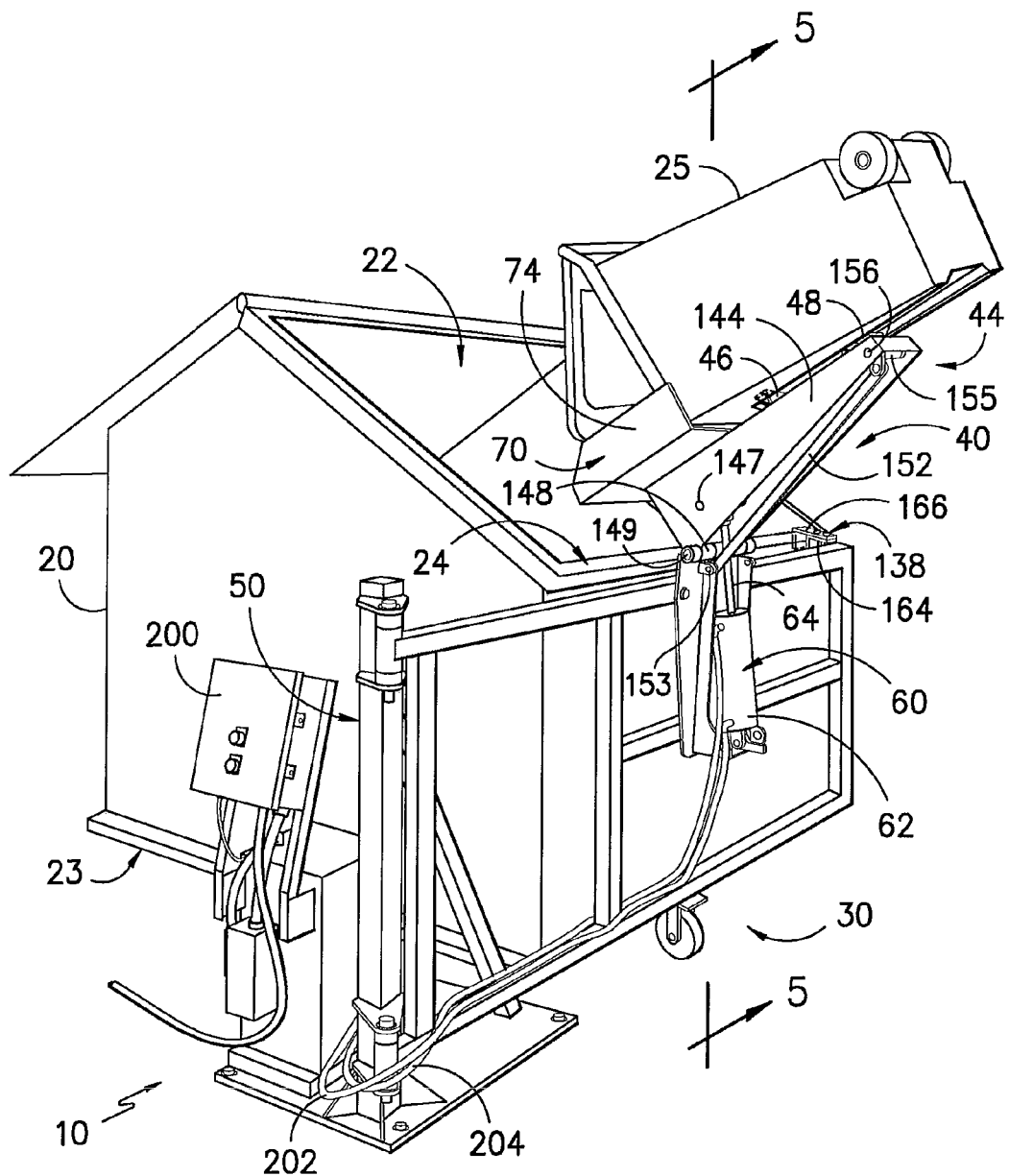
FIG. —3—

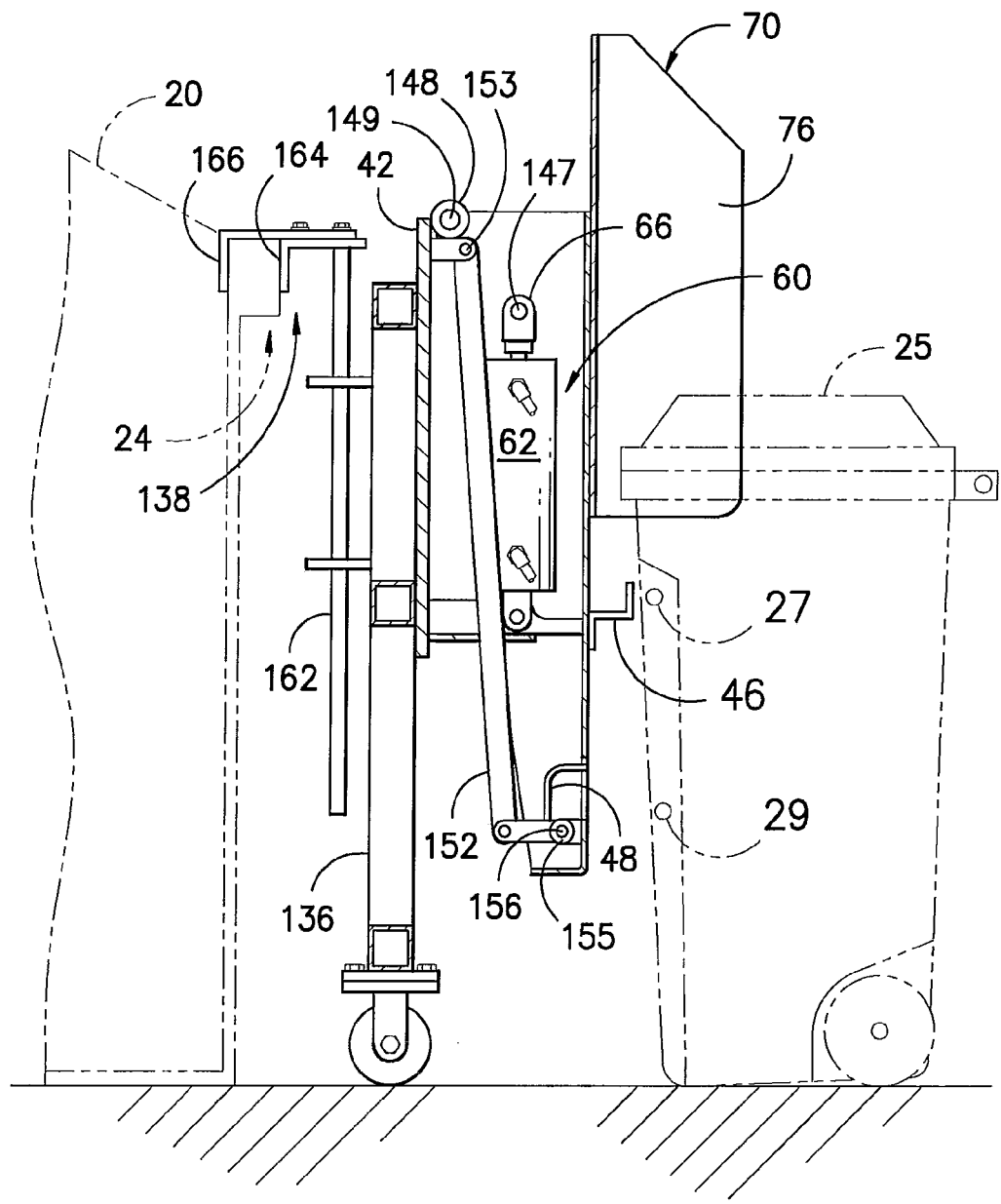
FIG. —4—

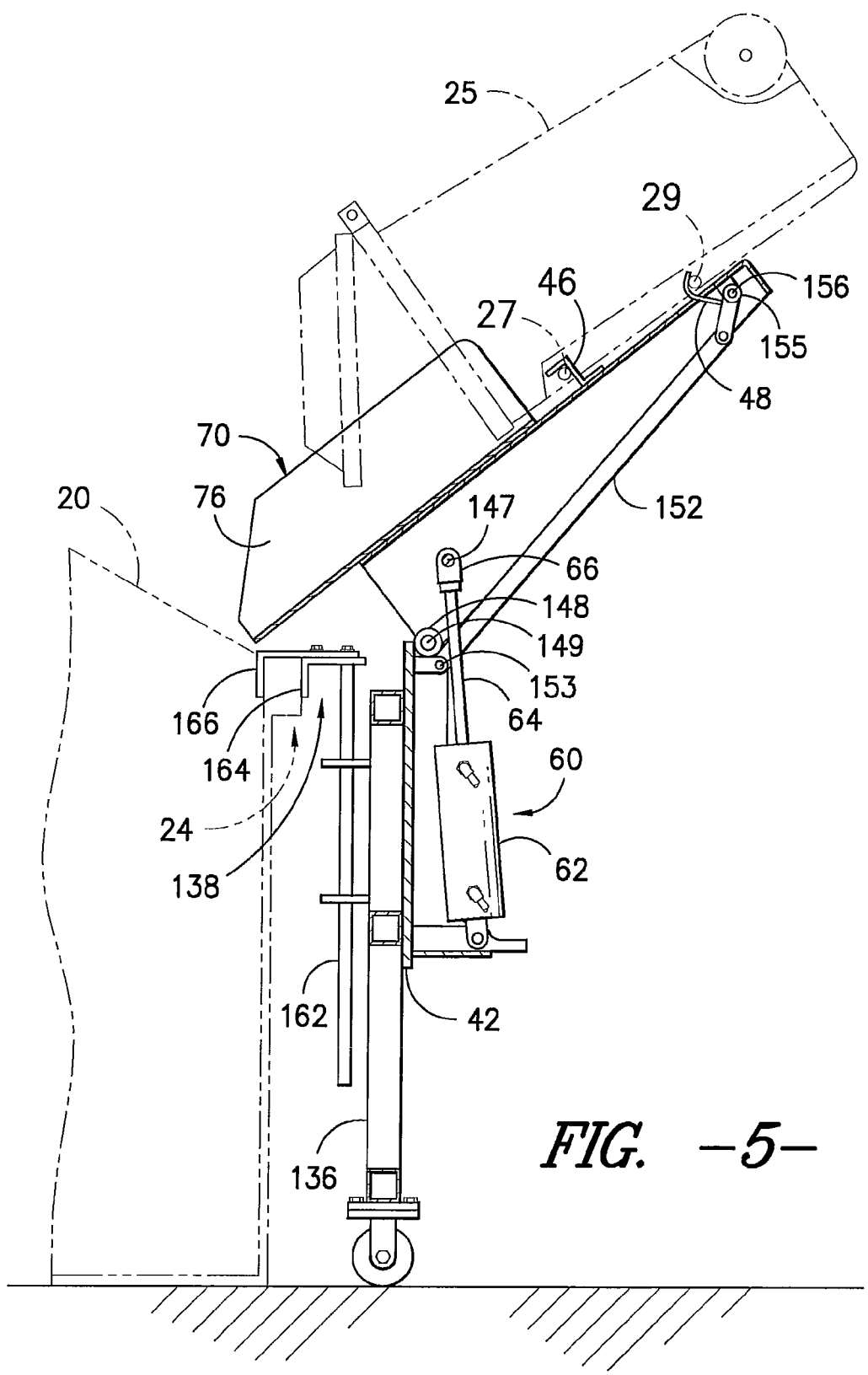
FIG. -5-

SWING-AWAY REFUSE RECEPTACLE LIFT

PRIORITY CLAIM

This application claims the benefit of previously filed U.S. Provisional Patent Application entitled "SWING-AWAY REFUSE RECEPTACLE LIFT," assigned U.S. Ser. No. 61/314,346, filed Mar. 16, 2010, and which is incorporated herein by reference for all purposes.

FIELD OF THE INVENTION

The present subject matter relates generally to improved receptacle dumping apparatus, and more specifically to receptacle lifters with swing-away features for use with various commercial and/or residential refuse collection receptacles.

BACKGROUND OF THE INVENTION

Technology related to residential and commercial refuse collection has advanced in the last several decades generally from the use of metal trash cans (which generally were manually lifted and dumped) to the use of receptacles with wheels which are rolled such as by a resident or employee to a location at which the receptacle is lifted and dumped by a particular lifting apparatus. One example of such a lifting apparatus for lifting and dumping rollable receptacles is disclosed in Bayne et al. (U.S. Pat. No. 4,773,812) issued Sep. 27, 1988, and Reexamination Certificate issued on Apr. 16, 1991.

Various different styles of receptacles have emerged, with specialized lifters for handling specific receptacle types. One receptacle type includes two opposing engagement members located respectively near the top and middle of the receptacle and which are grasped for lifting and dumping of the receptacle. Operation of a lifter engagement element below the upper receptacle engagement member permits the cart to be lifted, while operation of another lifter engagement element directed at the lower receptacle engagement member permits the receptacle to be retained on a lifter carriage as the receptacle is raised and inverted during dumping. Such receptacle style is in the industry sometimes referred to as a bar lift receptacle or U.S. or "Domestic" style receptacle.

The following patents all provide examples of such domestic style receptacles and typically hydraulically actuated lifting devices for raising and inverting such receptacles for dumping the contents thereof into a further receptacle such as a refuse collection vehicle or a relatively larger refuse container. For example, see cart 10 of FIG. 7 of Shive (U.S. Pat. No. 3,894,642), as well as the carts and corresponding lifters therefor as utilized in Borders (U.S. Pat. Nos. 4,422,814 and 4,365,922), and Brown et al. (U.S. Pat. No. 3,804,277). In general, such patents disclose various mechanisms for controllably manipulating a lower engagement member of the lifter in a generally downward direction for engaging the relative top side of a lower engagement bar of the receptacle to be emptied. Each of the patents are commonly assigned to Rubbermaid Corporation of Statesville, N.C., or its successor Applied Products, Inc., of Statesville, N.C., now Toter, Inc., of Statesville, N.C., a manufacturer or distributor of roll-out receptacles and receptacle lifters.

One alternate version of the domestic style receptacle is represented by refuse container 12 of FIG. 1 of Wyman et al. (U.S. Pat. No. 4,479,751). Other examples of lifter mechanisms designed for use with specific refuse receptacles are disclosed by Jones (U.S. Pat. No. 3,931,901) and Wells (U.S. Pat. No. 3,738,516).

Another known style of roll-out receptacle is known as a "European" style receptacle, an example of which is represented by cart 50 of FIG. 3 of Naab (U.S. Pat. No. 4,613,271).

Further, the following patents all provide further examples of receptacles and lifting devices. A self-adapting refuse receptacle lift with a low profile is disclosed in Bayne (U.S. Pat. No. 6,644,906). A residential refuse collection cart lifter with universal features is disclosed in Bayne et al. (U.S. Pat. No. 5,333,984). A segregated waste collection system is disclosed in Bayne (U.S. Pat. No. 6,357,988).

The subject matter of each of the above patents is fully incorporated herein by reference, and for all purposes.

While such receptacles and lifting devices permit mechanized dumping in some situations, manual dumping is still required in other situations. For example, in many commercial settings, such as at restaurants or other businesses, a relatively large, stationary refuse container may often be maintained at the restaurant or business for the disposal of refuse. The refuse container is generally maintained outside of the restaurant or business. Refuse disposed of within the refuse container is held in the refuse container until a refuse-gathering vehicle accesses the refuse container, dumps the refuse from the container into the vehicle, and transports the refuse to, for example, a landfill or the like. Employees of the restaurant or business often must manually carry or roll refuse receptacles containing refuse from the restaurant or business to the refuse container, and must manually lift the refuse receptacles to dump refuse into the refuse containers.

Further, generally speaking, in order to allow refuse-gathering vehicles access to refuse containers, the area adjacent to the refuse containers (such as the area directly in front of the containers) must be relatively unobstructed. Such unobstructed access may be desired in various situations to allow refuse-gathering vehicles to drive directly up to and interact with the refuse containers. Commonly known stationary lifting devices would obstruct such access in many situations and in such situations would prevent refuse-gathering vehicles from accessing refuse containers.

While various aspects and alternative embodiments of refuse containers or receptacles may be known in the field of container/receptacle lifting, no one design has emerged that generally encompasses the above-referenced characteristics and other desirable features associated with lifter technology as herein presented.

SUMMARY OF THE INVENTION

Aspects and advantages of the present subject matter will be set forth in part in the following description, or may be apparent from the description, or may be learned through practice of the present subject matter.

The present disclosure recognizes and addresses the above-noted drawbacks and disadvantages of typical prior art refuse containers, refuse receptacles, and lifting devices.

It is a general object of the present disclosure to provide an improved lifting device. It is a more specific object of the present disclosure to provide a lifting device that permits mechanized dumping of refuse receptacles into refuse containers while providing unobstructed access to the refuse containers for refuse-gathering vehicles.

Thus, the present disclosure is directed to receptacle lifters with swing-away features for use with various commercial (and in some instances, residential) refuse collection receptacles. The swing-away lift of the present disclosure may be utilized in conjunction with, for example, a refuse container and a refuse receptacle. The swing-away lift may include, for example, a pivot leg, a swing arm, and a lift unit. The pivot leg may provide a secure base for the swing-away lift, and may prevent movement of the lift.

A present exemplary swing arm may be pivotably connected to the pivot leg, and may pivot between a first closed position and a second open position. When the swing arm is in the first closed position, the swing-away lift may be utilized for mechanized dumping of the contents of a refuse receptacle into the refuse container. When the swing arm is in the second open position, the swing-away lift may provide unobstructed access to the refuse container, such that a refuse-gathering vehicle can interact with the refuse container, such as to collect the contents of the refuse container and/or to place or remove a refuse container.

The swing arm may further in some instances and embodiments be provided with features such as wheels or engagement members. Such features may provide the swing-away lift with stability, assist the swing arm in pivoting between the first closed position and second open position, and/or provide safety features for the swing-away lift when the swing arm is in the first closed position.

One present exemplary embodiment of a present swing-away lift may further include refuse container guides, which may assist a refuse-gathering vehicle in properly positioning a refuse container with respect to the swing-away lift after the vehicle interacts with the refuse container.

In some present exemplary embodiments, a lift unit may be mounted to the swing arm of the swing-away lift of the present disclosure. It should be understood that, generally speaking, the lift unit may be any lift unit known in the refuse collection art. The lift unit may provide mechanized lifting of a refuse receptacle. Thus, a user of the swing-away lift can provide a refuse receptacle to the swing-arm lift, and then utilize the lift unit of the swing-arm lift to mechanically (rather than manually) lift the refuse receptacle and dump the contents of the receptacle into a refuse container.

One present exemplary embodiment in accordance with present subject matter relates to a swing-away lift for mechanized dumping of the contents of a refuse receptacle into a refuse container, comprising a pivot leg assembly, a swing arm assembly, and a lift unit. Preferably, such swing arm assembly is pivotably connected to such pivot leg assembly, for pivoting between a first closed position and a second open position thereof, relative to an associated refuse container, and such lift unit is supported on such swing arm assembly for movement therewith, for mechanized lifting and dumping of an associated refuse receptacle into an associated refuse container whenever such swing arm assembly is in such first closed position thereof. Advantageously, when such swing arm assembly of such exemplary lift is in such second open position thereof, it allows unobstructed access to the associated refuse container for a refuse-gathering vehicle.

In certain of such exemplary embodiments, such swing arm assembly may further include an engagement mechanism, configured to engage an associated refuse container whenever such swing arm assembly is in such first closed position thereof, for preventing such swing arm assembly from pivoting away from such associated refuse container. Further, such engagement mechanism in some embodiments may also include a movable member for correspondingly engaging and disengaging, respectively, such swing arm mechanism from an associated refuse container.

In other present alternatives, such swing arm assembly may include a support frame for mounting of such lift unit thereon. Additionally, such support frame may be movably received on such swing arm assembly, so that such lift unit may correspondingly be moved laterally along such swing arm assembly.

In other present alternatives, such lift unit may include a pivoting carriage, for movement between a first lowered position and a second raised position, and configured to receive an associated refuse receptacle to be emptied into an associated refuse container. In alternatives of the foregoing, such lift unit may further include an actuation device, configured for causing such carriage to pivot between such first lowered position and such second raised position thereof, and a control system for controlling operation of such actuation device. Still further, such actuation device may comprise one of a hydraulic cylinder, a pneumatic cylinder, a rack-and-pinion system, and a rotary actuator.

In yet other alternative aspects, such lift unit may further include a receptacle engagement member for automatically engaging a receptacle for securement of such receptacle to such carriage whenever such carriage is in such second raised position thereof, to prevent such associated receptacle from falling into an associated refuse container.

Alternatively, such carriage may include a chute for guiding refuse from the associated refuse receptacle to the associated refuse container whenever such carriage is in such second raised position thereof. In other present alternative swing-away lift arrangements, such pivot leg assembly may include a base in a fixed location relatively adjacent a location for receipt of an associated refuse container, a shaft extending from such base, and at least one pivot point received on such shaft for attachment of such swing arm assembly thereto. In some of such embodiments, such swing arm assembly may include at least one beam extending generally transversely relative to such pivot leg assembly shaft, and at least one cross-beam supported relative to such transverse beam. Such an alternative swing-away lift may in some arrangements further include a rotation sleeve disposed adjacent and connected to one end of such transverse beam, and pivotally connected to such pivot leg assembly at such pivot point thereof. Still further additionally, a plurality of pivot points may be received on such shaft in some embodiments, and a corresponding plurality of rotation sleeves may be provided, each disposed adjacent of an end of such transverse beam, and respectively associated with one of such plurality of pivot points. Further, such lift unit may be secured to beams of such swing arm assembly.

In other present alternative arrangements of the foregoing swing-away lift subject matter, such pivot leg assembly may include a base in a fixed location on a supporting surface relatively adjacent a location for receipt of an associated refuse container, and such lift may further include rotating support members carried on such swing arm assembly for interacting with such supporting surface, for stability of such lift as such swing arm assembly moves between such first closed position and such second open position thereof.

Per yet other present alternatives, such pivot leg assembly may include a base in a fixed location relatively adjacent a location for receipt of an associated refuse container, a shaft extending from such base, and at least one pivot point received on such shaft for attachment of such swing arm assembly thereto. Such swing arm assembly may include an engagement mechanism having a movable member configured to selectively engage an associated refuse container whenever such swing arm assembly is in such first closed position thereof, for preventing such swing arm assembly from pivoting away from such associated refuse container; and such swing arm assembly may further include a support frame movably received on such swing arm assembly, for mounting of such lift unit thereon, so that such lift unit may correspondingly be moved laterally along such swing arm assembly; and such lift unit may include a pivoting carriage, for movement between a first lowered position and a second raised position, and configured to receive an associated refuse receptacle to be emptied into an associated refuse container; an actuation device, configured for causing such carriage to pivot between such first lowered position and such second raised position thereof; and a control system for controlling operation of such actuation device.

In other alternatives, such a swing-away lift may further include refuse container guides, for guiding positioning of an associated refuse container relative to such lift, so that when such swing arm assembly is in such first closed position thereof, such swing arm is substantially adjacent such associated refuse container. In other alternatives, the associated refuse container may be one of a commercial, residential, and split-bin refuse collection container having at least one refuse receiving opening, and the associated refuse receptacle may be a rollable receptacle.

Yet another exemplary embodiment in accordance with the present subject matter relates to a movable lift for use with an associated refuse container, to facilitate controlled dumping of associated refuse receptacle contents therein, while otherwise allowing unobstructed access to the associated refuse container by a refuse-gathering vehicle. Such an exemplary movable lift preferably comprises a base in a fixed location on a supporting surface relatively adjacent a location for receipt of an associated refuse container; a plurality of pivot points supported on such base; a movable support assembly including a plurality of beams, some of which are supported on such plurality of pivot points such that such movable support assembly is configured for pivoting between a first closed position and a second open position thereof, relative to an associated refuse container; and mechanized dumping means. Such dumping means are preferably received on such movable support assembly for movement therewith relative to an associated refuse container, for mechanized dumping of an associated refuse receptacle into an associated refuse container whenever such movable support assembly is in such first closed position thereof.

Per certain alternatives of such an exemplary movable lift, a support frame may be further movably received on such movable support assembly, and supporting such mechanized dumping means thereon, so that such dumping means is correspondingly movable laterally along such movable support assembly.

Yet other alternative movable lift embodiments may further include guide beams positioned in a tapered configuration on the supporting surface for an associated refuse container, for assisting placement of such refuse container by a refuse-gathering vehicle. In other present alternatives, at least one wheeled support member is further included, received on an underside of such movable support assembly and riding on a supporting surface, for stability of such movable lift as such movable support assembly moves between such first closed position and such second open position thereof.

Other alternative movable lift embodiments may further include an engagement element, associated with such movable support assembly and movable between engaged and disengaged positions thereof, respectively, relative to an associated refuse container, for selectively preventing movement of such movable support assembly relative to such associated refuse container.

Still further, the foregoing mechanized dumping means is some configurations may include a hydraulically driven carriage, pivotably mounted for movement between a first lowered position and a second raised position, and configured to receive an associated refuse receptacle to be emptied into an associated refuse container, and a hydraulic control system for selectively actuating such carriage.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents including combinations of features, parts, or steps or configurations thereof not expressly shown in the figures or stated in the detailed description of such figures. Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification. The accompanying drawings, which are incorporated in and constitute a part of this specification, illustrate embodiments of the present subject matter and, together with the description, serve to explain the principles of the present subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 is a perspective view of one exemplary embodiment of a swing-away lift of the present disclosure in a first closed position with a representative lift unit in a first lowered position thereof;

FIG. 2 is a perspective view of one exemplary embodiment of a swing-away lift of the present disclosure in a second open position with a representative lift unit in a first lowered position thereof;

FIG. 3 is a perspective view of one exemplary embodiment of a swing-away lift of the present disclosure in a first closed position with a representative lift unit in a second raised position thereof;

FIG. 4 is a side view of one exemplary embodiment of a lift unit of the present disclosure in a first lowered position thereof; and FIG. 5 is a side view of one exemplary embodiment of a lift unit of the present disclosure in a second raised position thereof.

DETAILED DESCRIPTION OF THE PREFERRED EMBODIMENTS

Reference now will be made in detail to exemplary embodiments of the present subject matter, one or more examples of which are illustrated in the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

FIGS. 1 through 5 illustrate an exemplary embodiment of a swing-away lift generally 10 of the present disclosure. The lift 10 may be utilized in conjunction with, for example, a refuse container generally 20 and a refuse receptacle generally 25. The refuse container 20 may include a refuse receiving opening 22, into which the contents of the refuse receptacle 25 may be dumped in accordance with the present disclosure. Generally speaking, the refuse container 20 and refuse receptacle 25 may be any container and receptacle in the refuse collection art. For example, the refuse container 20 and refuse receptacle 25 may be configured to collect recyclables rather than, or in addition to, refuse. In one embodiment, for example, the refuse container 20 and refuse receptacle 25 may be provided with split-bin configurations, as represented by dotted lines in FIG. 1. Such a split-bin configuration may allow users of the refuse receptacles 25 to deposit, for example, refuse and recyclables, various varieties of refuse, or various varieties of recyclables, in separate bins within a single refuse receptacle 25. The split-bin configuration may further allow for the separated refuse and recyclables to be transferred to and remain in separate bins within the refuse container 20.

The swing-away lift 10 of the present disclosure may include, for example, a pivot leg 50, a swing arm 30, and a lift unit 40. The pivot leg 50 may include a base 52 and a shaft 54. The base 52 may be secured in order to prevent movement of the lift 10. For example, the base 52 may be securably fastened to the ground, such as to the pavement, to a loading dock, to a shop floor, or the like. The base 52 may be secured using any securing means known in the art, such as bolting, welding, clamping, or the like. The shaft 54 may extend from the base 52, and may provide a pivot point 56 or pivot points 56 for the swing arm 30.

The swing arm 30 may be pivotably connected to the pivot leg 50. For example, the swing arm 30 may include a beam 32 extending generally transversely with respect to the pivot leg 50. Further, the swing arm 30 may include a plurality of beams, as well as a cross-beam 132 or plurality of cross-beams. For example, in one embodiment, the swing arm 30 may include an upper beam 32, a lower beam 36, and a middle beam 34, as well as a first cross-beam 132, second cross-beam 134, and third cross-beam 136.

The swing arm 30 may further include a rotation sleeve 38 disposed adjacent and connected to one end of a beam 32. Further, the swing arm 30 may include a plurality of rotation sleeves 38, each of the rotation sleeves 38 disposed adjacent to one end of a beam 32. For example, in one embodiment, the swing arm 30 may include two rotation sleeves 38, the rotation sleeves 38 disposed adjacent and connected to the upper beam 32 and lower beam 36. The rotation sleeve or sleeves 38 may be pivotally connected to the pivot leg 50 at pivot point or pivot points 56, thus allowing the swing arm 30 to pivot about the pivot leg 50.

The swing arm 30 may pivot about the pivot leg 50 between a first closed position, as represented in FIG. 1, and a second open position, as represented in FIG. 2. In the first closed position, for example, the swing arm 30 may be positioned substantially adjacent to the refuse container 20. When the swing arm 30 is in the first closed position, the lift 10 may be utilized for dumping the contents of the refuse receptacle 25 through the opening 22 into the refuse container 20. In the second open position, however, the swing arm 30 may be spaced from the refuse container 20, allowing unobstructed access to the refuse container 20. When the swing arm 30 is in the second open position, for example, a refuse-gathering vehicle may be allowed access to the refuse container 20 without any obstruction or interference by the lift 10, such that the refuse-gathering vehicle can interact with the refuse container 20 to collect the contents of the refuse container 20 and/or to place/move same.

The swing arm 30 may further include a wheel, caster, or similar, generally 39. Further, the swing arm 30 may include more than one wheel 39. The wheel or wheels 39 may be, for example, caster wheels. The wheel or wheels 39 may be disposed adjacent and connected to the swing arm 30, such as adjacent and connected to a beam 32, 34, 36 or cross-beam 132, 134, 136 of the swing arm 30.

Further the wheel or wheels 39 may be in contact with or adjacent to the ground, and may be spaced along the swing arm 30 from the pivot leg 50. For example, in one embodiment, a wheel 39 may be disposed adjacent and connected to lower beam 36. The wheel 39 may be spaced from the pivot leg 50 such that it is substantially aligned with the lift unit 40. Thus, the wheel or wheels 39 may support the swing arm 30 at a distance along the swing arm 30 spaced from the pivot leg 50, preventing the swing arm 30 from bending, and reducing the bending moment of the swing arm 30. Further, the wheel or wheels 39 may facilitate the pivotal movement of the swing arm 30 with respect to the pivot leg 50 between the first closed position and the second open position.

The swing arm 30 may further include an engagement member 138, as shown in FIGS. 2 through 5. The engagement member 138 may be disposed adjacent and connected to the swing arm 30, such as adjacent and connected to a beam 32, 34, 36 or cross-beam 132, 134, 136 of the swing arm 30. For example, in one present exemplary embodiment, the engagement member 138 may be disposed adjacent and connected to the third cross-beam 136. The engagement member 138 may be configured to engage the refuse container 20 when the swing arm 30 is in the first closed position, preventing the swing arm 30 from pivoting away from the refuse container 20.

For example, in one representative embodiment as shown in FIGS. 2, 4 and 5, the engagement member 138 may include a shaft 162. The shaft 162 may be pivotally and/or axially adjustable with respect to the longitudinal axis of the shaft 162, allowing a user of the lift 10 to pivot and axially displace the engagement member 138, so as to correspondingly engage and disengage, respectively, the swing arm 30 from the refuse container 20.

The engagement member 138 may further include a fixed engagement component 164 and an adjustable engagement component 166. For example, in one exemplary embodiment, the engagement components 164 and 166 may each be substantially L-shaped. As shown in FIGS. 3 through 5, the engagement components 164 and 166 may thus be configured to engage a front lip generally 24 of the refuse container 20. The adjustable engagement component 166 may be slidably adjustable with respect to the fixed engagement component 164, allowing the engagement member 138 to engage a wide variety of refuse containers 20 with varying front lip 24 thicknesses.

It should be understood that the engagement member 138 is not limited to an embodiment including a shaft 162 and engagement components 164 and 166 as disclosed above. For example, in another present exemplary embodiment, the engagement member 138 may be a chain, the chain connected at one end to the swing arm 30 and configured to engage the refuse container 20, preventing the swing arm 30 from pivoting away from the refuse container 20. For example, the chain may include a hook member disposed on the end of the chain opposite the swing arm 30. Further, in other embodiments, the engagement member 138 may take any other form known in the art that could effectively engage the refuse container 20 to prevent the swing arm 30 from pivoting away from the refuse container 20.

The lift 10 of the present disclosure may further include a refuse container guide or guides 23, as shown in FIGS. 1 through 3. The guides 23 may act to position the refuse container 20 with respect to the lift 10, such that when the swing arm 30 is in the first closed position, the swing arm 30 is substantially adjacent to the refuse container 20. For example, in one embodiment, the guides 23 may be visual guides, such as markings or tape on the ground outlining the proper position of the refuse container 20 with respect to the lift 10. In another embodiment, however, the guides 23 may be physical guides, such as support beams. The support beam guides 23 may be placed to outline the proper or desired position of the refuse container 20 with respect to the lift 10.

Further, the support beam guides 23 may be placed in a tapered configuration, to assist the placement and positioning of the refuse container 20. Thus, when a refuse-gathering vehicle accesses the refuse container 20 and collects the contents of the refuse container 20, the guides 23 may assist the vehicle in properly repositioning the refuse container 20 with respect to the lift 10.

The lift unit generally 40 may be mounted to the swing arm 30. For example, the lift unit 40 may include a support frame 42. The support frame 42 may be connected to the swing arm 30, such as to the beams 32, 34, 36 or cross-beams 132, 134, 136. For example, in one embodiment, the support frame 42 may be connected to the upper beam 32 and the middle beam 34. The support frame 42 may be connected to the swing arm using any securing means or mechanism known in the art, such as bolting, welding, clamping, or the like. In another embodiment, however, the support frame 42 may be movably connected to the swing arm 30. For example, the support frame 42, and thus the lift unit 40, may be movable laterally along the swing arm 30. The swing arm 30, such the beams 32, 34, 36 or cross-beams 132, 134, 136, may include tracks, and the support frame 42 may be movably mounted to the tracks such that the support frame 42 may slide laterally along the length, or a portion of the length, of the swing arm 30. It is to be understood by those of ordinary skill in the art that various mechanical arrangements (manually displaced, or otherwise driven) may be practiced in conjunction with such lateral placement. For example, the lateral movement of the support frame 42 may allow the lift unit 40 to dump the contents of the refuse receptacle 25 through the receiving opening 22 into the refuse container 20 at laterally varying locations within the refuse container 20, preventing a buildup of refuse at any one location within the refuse container 20 and/or desirably positioning the lift unit 40 so as dump particular refuse materials into particular sections of refuse container 20 (for example, such as in the case of segregated recyclables).

The lift unit 40 may further include a carriage 44. The carriage 44 may include, for example, a generally planer carriage surface 142, and transverse carriage surfaces 144 and 146 (see FIG. 2). The carriage 44 may be pivotally connected to the support frame 42. For example, in one representative embodiment as shown in FIGS. 3 and 4, the carriage 44 may include a pivot sleeve or sleeves 148. The pivot sleeve or sleeves 148 may be pivotally connected to the support frame 42 at a pivot point or pivot points 149. The pivotal connection of the carriage 44 and the support frame 42 may allow the carriage 44 to pivot between a first lowered position as shown in FIGS. 1 and 2, and a second raised position as shown in FIGS. 3 and 4. When in the first lowered position, the carriage 44 may be configured to receive a receptacle 25 to be dumped. When in the second raised position, the carriage 44 may be inverted, such that the contents of the receptacle 25 may be dumped through the receiving opening 22 into the refuse container 20.

The lift unit 40 may further include an actuation device or devices generally 60, as representatively illustrated in FIGS. 3 through 5. The actuation device 60 may be configured to interact with the carriage 44, causing the carriage 44 to pivot between the first lowered position and the second raised position. For example, in one embodiment, the actuation device 60 may by a hydraulic cylinder. The cylinder may include a barrel 62, a rod 64, and a rod head 66. The rod 64 may reciprocate in a generally linear fashion in reaction to the operation of an internal piston (not shown), the operation of which may be controlled by a control system generally 200. The rod head 66, disposed on the end of the rod 64 external of the barrel 62, may be rotatably connected to the carriage 44. For example, the carriage 44 may include a shaft 147 disposed between the transverse carriage surfaces 144 and 146. The rod head 66 may be rotatably connected to the shaft 147, such that the rod head 66 can rotate about the shaft 147. Thus, as the rod 64 reciprocates in a linear fashion, the rotatable connection between the rod head 66 and the shaft 147 and the pivotal connection between the carriage 44 and the support frame 42 allow the carriage 44 to pivot between the first lowered position and the second raised position.

It should be understood that the actuation device 60 of the present disclosure is not limited to a hydraulic cylinder. For example, the actuation device 60 may be a pneumatic cylinder, a rack-and-pinion system, a rotary actuator, or any other actuation device known in the art or later developed that would operate to allow the carriage 44 to pivot between a first lowered position and a second raised position.

Operation of the actuation device 60 may be controlled by a control system 200. For example, in one embodiment where actuation device 60 is a hydraulic cylinder, the control system 200 may regulate supply line 202 and return line 204, which may be configured to supply hydraulic fluid to the actuation device 60 and allow the hydraulic fluid to return from the actuation device 60, respectively. However, it should be understood that the control system 200 is not limited to applications involving hydraulic cylinders. Rather, the control system 200 may be configured to control any actuation device 60 known in the art, or later developed.

When in the first lowered position, as shown in FIGS. 1, 2 and 4, the carriage 44 may be configured to receive a receptacle 25 to be dumped. For example, the receptacle 25 may include upper and lower engagement members 27 and 29, respectively, which may cooperate with upper and lower engagement elements 46 and 48, respectively, of the lift unit 40. For example, when the lift unit 40 is in the first lowered position, a receptacle 25 may be moved into position adjacent the carriage 44. The lid of the receptacle 25 may be opened or removed in anticipation of the contents thereof being dumped through the receiving opening 22 into the refuse container 20. Once so positioned, the receptacle 25 may be tilted back and guided into contact with the planar surface 142 of carriage 44 such that the upper engagement element 46 of the lift unit 40 engages with the upper engagement member 27 of the receptacle 25.

Further, during a dumping cycle in which carriage 44 is pivoted into a second raised position as illustrated in FIGS. 3 and 5 from its first lowered position as illustrated in FIGS. 1, 2 and 4, so that the contents of the receptacle 25 are dumped through the receiving opening 22 into the refuse container 20, the lower engagement element 48 automatically engages the lower engagement member 29 of the receptacle 25 so as to prevent the receptacle 25 from falling into the refuse container 20. For example, as shown in FIGS. 3 and 5, lower engagement element 48 may be driven by a linkage system which interconnects the element 48 and the support frame 42. In one embodiment of the linkage system, an arm 152 may be pivotally connected at one end to support frame 42 at a pivot point 153. The arm 152 may further be pivotally connected to a transverse arm 155. The lower engagement element 48 may be fastened to the transverse arm 155, and the transverse arm 155 may be rotatably connected to the carriage 44 at a rotation point 156.

Thus, as the carriage 44 pivots from the first lowered position to the second raised position, the arm 152 pivots about the pivot point 153 and causes the transverse arm 155 to rotate about the rotation point 156, causing the lower engagement element 48 to project outward from planer surface 142 of the carriage 44. In other words, the lower engagement element 48 is projected outward from planer surface 142 of the carriage 44 to latch onto the lower engagement member 29 of the receptacle 25 as the carriage 44 pivots from the first lowered position to the second raised position. Further, as the carriage 44 pivots from the second raised position to the first lowered position, the arm 152 pivots about the pivot point 153 and causes the transverse arm 155 to rotate about the rotation point 156, causing the lower engagement element 48 to retract inward. In other words, the lower engagement element 48 is retracted inward as the carriage 44 pivots from the second raised position to the first lowered position and as the upper engagement element 46 of the lift unit 40 reengages with the upper engagement member 27 of the receptacle 25.

The carriage 44 may further include a chute 70, as illustrated in FIGS. 1 through 5. The chute 70 may be fastened to the planer carriage surface 142, and may guide refuse from the refuse receptacle 25 to the refuse container 20 when the carriage 44 is in the second raised position. For example, the chute 70 may include a planar chute surface 72 and transverse chute surfaces 74 and 76. The planar chute surface 72 may provide a support surface for refuse as the refuse is guided from the refuse receptacle 25 to the refuse container 20. The transverse chute surfaces 74 and 76 may act to prevent refuse from spilling off the sides of the planar chute surface 72 as the refuse is guided from the refuse receptacle 25 to the refuse container 20.

The present disclosure describes various embodiments of a lift unit 40 included in the swing-away lift 10. However, it should be understood that the lift unit 40 of the present disclosure is not limited to those embodiments described, but may be any lift unit known in the refuse collection art for lifting a refuse receptacle 25. Further, this disclosure describes various embodiments of a refuse receptacle 25 and refuse container 20 for use with the swing-away lift 10. However, it should be understood that the refuse receptacle 25 and refuse container 20 of the present disclosure are not limited to those embodiments described, but may be any refuse receptacle 25 and refuse container 20 known in the refuse collection art.

This written description uses examples to disclose the present subject matter, including the best mode, and also to enable any person skilled in the art to practice the present subject matter, including making and using any devices or systems and performing any incorporated methods.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A swing-away lift for mechanized dumping of the contents of a refuse receptacle into a refuse container, comprising:
   a pivot leg assembly;
   a swing arm assembly, pivotably connected to said pivot leg assembly, for pivoting about a substantially vertical axis between a first closed position and a second open position thereof, relative to an associated refuse container; and
   a lift unit, supported on said swing arm assembly for movement therewith, for mechanized lifting and dumping of an associated refuse receptacle into an associated refuse container whenever said swing arm assembly is in said first closed position thereof;
   wherein said lift unit includes a pivoting carriage with an actuation device and a control system for controlling operation of said actuation device, configured for causing the mechanized lifting and dumping of an associated refuse receptacle by driving the pivoting carriage between a first lowered position and a second raised position, and configured to receive, support, and invert an associated refuse receptacle to be emptied into an associated refuse container; and
   said lift, when said swing arm assembly is in said first closed position thereof, restricts access to the associated refuse container for a refuse gathering vehicle and when said swing arm assembly is in said second open position thereof, allows unobstructed access to the associated refuse container for a refuse-gathering vehicle.

2. A swing-away lift as in claim 1, wherein said swing arm assembly further includes an engagement mechanism, configured to engage an associated refuse container whenever said swing arm assembly is in said first closed position thereof, for preventing said swing arm assembly from pivoting away from such associated refuse container.

3. A swing-away lift as in claim 2, wherein said engagement mechanism includes a movable member for correspondingly engaging and disengaging, respectively, said swing arm mechanism from an associated refuse container.

4. A swing-away lift as in claim 1, wherein said swing arm assembly includes a support frame for mounting of said lift unit thereon.

5. A swing-away lift as in claim 4, wherein said support frame is movably received on said swing arm assembly, so that said lift unit may correspondingly be moved laterally along said swing arm assembly.

6. A swing-away lift as in claim 1, wherein said actuation device comprises one of a hydraulic cylinder, a pneumatic cylinder, a rack-and-pinion system, and a rotary actuator.

7. A swing-away lift as in claim 1, wherein said lift unit further includes a receptacle engagement member for automatically engaging a receptacle for securement of such receptacle to said carriage whenever said carriage is in said second raised position thereof, to prevent such associated receptacle from falling into an associated refuse container.

8. A swing-away lift as in claim 1, wherein said carriage further includes a chute for guiding refuse from the associated refuse receptacle to the associated refuse container whenever said carriage is in said second raised position thereof.

9. A swing-away lift as in claim 1, wherein said pivot leg assembly includes a base in a fixed location relatively adjacent a location for receipt of an associated refuse container, a shaft extending from said base, and at least one pivot point received on said shaft for attachment of said swing arm assembly thereto.

10. A swing-away lift as in claim 9, wherein said swing arm assembly includes at least one beam extending generally transversely relative to said pivot leg assembly shaft, and at least one cross-beam supported relative to such transverse beam.

11. A swing-away lift as in claim 10, further including a rotation sleeve disposed adjacent and connected to one end of such transverse beam, and pivotally connected to said pivot leg assembly at said pivot point thereof.

12. A swing-away lift as in claim 11, further including a plurality of pivot points received on said shaft, and a corresponding plurality of rotation sleeves, each disposed adjacent of an end of such transverse beam, and respectively associated with one of said plurality of pivot points.

13. A swing-away lift as in claim 10, wherein said lift unit is secured to beams of said swing arm assembly.

14. A swing-away lift as in claim 1, wherein said pivot leg assembly includes a base in a fixed location on a supporting surface relatively adjacent a location for receipt of an associated refuse container, and said lift further includes rotating support members carried on said swing arm assembly for interacting with such supporting surface, for stability of said lift as said swing arm assembly moves between said first closed position and said second open position thereof.

15. A swing-away lift as in claim 1, wherein:
said pivot leg assembly includes a base in a fixed location relatively adjacent a location for receipt of an associated refuse container, a shaft extending from said base, and at least one pivot point received on said shaft for attachment of said swing arm assembly thereto;
said swing arm assembly includes an engagement mechanism having a movable member configured to selectively engage an associated refuse container whenever said swing arm assembly is in said first closed position thereof, for preventing said swing arm assembly from pivoting away from such associated refuse container; and
said swing arm assembly further includes a support frame movably received on said swing arm assembly, for mounting of said lift unit thereon, so that said lift unit may correspondingly be moved laterally along said swing arm assembly.

16. A swing-away lift as in claim 1, further including refuse container guides, for guiding positioning of an associated refuse container relative to said lift, so that when said swing arm assembly is in said first closed position thereof, said swing arm is substantially adjacent such associated refuse container.

17. A swing-away lift as in claim 1, wherein the associated refuse container is one of a commercial, residential, and split-bin refuse collection container having at least one refuse receiving opening, and the associated refuse receptacle is a rollable receptacle.

\* \* \* \* \*